United States Patent [19]
Monro et al.

[11] Patent Number: 5,768,437
[45] Date of Patent: Jun. 16, 1998

[54] FRACTAL CODING OF DATA

[75] Inventors: Donald Martin Monro, Beckington; Frank Dudbridge, Cumnor Hill, both of England

[73] Assignee: Bri Tish Technology Group Ltd., London, England

[21] Appl. No.: 295,637

[22] PCT Filed: Mar. 1, 1993

[86] PCT No.: PCT/GB93/00422

§ 371 Date: Aug. 26, 1994

§ 102(e) Date: Aug. 26, 1994

[87] PCT Pub. No.: WO93/17519

PCT Pub. Date: Sep. 2, 1993

[30] Foreign Application Priority Data

Feb. 28, 1992 [GB] United Kingdom ............ 9204360

[51] Int. Cl.$^6$ .................. G06K 9/36; G06K 9/46
[52] U.S. Cl. .................... 382/249; 358/433
[58] Field of Search .................. 382/248–250, 382/232–233; 358/432, 433, 426; 348/403, 420, 395

[56] References Cited

U.S. PATENT DOCUMENTS

| | | | |
|---|---|---|---|
| 4,837,447 | 6/1989 | Pierce et al. | 250/492.2 |
| 4,941,193 | 7/1990 | Barnsley et al. | 382/249 |
| 5,274,466 | 12/1993 | Ida et al. | 358/426 |
| 5,321,776 | 6/1994 | Shapiro | 382/248 |
| 5,347,600 | 9/1994 | Barnsley et al. | 382/249 |

FOREIGN PATENT DOCUMENTS 9100666  1/1991  WIPO .

OTHER PUBLICATIONS

Proc. IEEE ICASSP 1990, pp. 2225–2228, Jacquin, A.E. "A novel fractal block–coding technique for digital images" cited in the application p. 2.

Sixth International Conference on Digital Processing of Signals in Commnications, Sep. 1991, Loughborough,UK pp. 235–239, Kaouri, H.A. "Fractal coding of still images" see the whole document.

Proceedings of the Royal Society of London, vol. A399, 1985, London, UK, pp. 243–275, Barnsley, M.F. et al "Iterated function systems and the global construction of fractals" cited in the application pp. 2 & 19.

Monro et al. "Deterministic Rendering of Self–Affine Fractals" IEE Collog. (1990) No. 171: The Application of Fractal Techniques in Image . . . pp. 5/1–5/4.

Freeland et al., "IFS Fractals and the Wavelet Transform," ICASSP Conference, 1990, pp. 2345–2348.

Mazel et al., "Hidden–Variable Fractal Interpolation of Discrete Sequences," ICASSP Conference, Apr. 1991, pp. 3393–3396.

*Primary Examiner*—Leo Boudreau
*Assistant Examiner*—Bhavesh Mehta
*Attorney, Agent, or Firm*—Cushman Darby & Cushman IP Group of Pillsbury Madison & Sutro LLP

[57] ABSTRACT

A method of fractal coding of data and apparatus therefor, which method comprises dividing data into domains, determining a set of transformations relating the domains to the data in such a manner as to minimize error between the data and an approximation to the data obtained by application of the transformation, and providing an expression of a series of quantized fractal coefficients characterizing the transformations. A transformation includes at least one part indicating a domain and at least another (functional) part indicating a value for a measure associatable with a specific domain or aspect thereof.

27 Claims, 9 Drawing Sheets

$$T_k = \begin{bmatrix} M_x^{(k)} \cos\theta_x^{(k)} & -M_y^{(k)} \sin\theta_y^{(k)} \\ M_x^{(k)} \sin\theta_x^{(k)} & M_y^{(k)} \cos\theta_y^{(k)} \end{bmatrix}$$

Fig.6

$$S_k = \begin{bmatrix} S_x^{(k)} \\ S_y^{(k)} \end{bmatrix}$$

Fig.7

$$U_k : \begin{bmatrix} x \\ y \\ z \end{bmatrix} \rightarrow \begin{bmatrix} M_x^{(k)} \cos\theta_x^{(k)} & -M_y^{(k)} \sin\theta_y^{(k)} & 0 \\ M_x^{(k)} \sin\theta_x^{(k)} & M_y^{(k)} \cos\theta_y^{(k)} & 0 \\ a_1^{(k)} & a_2^{(k)} & a_3^{(k)} \end{bmatrix} \begin{bmatrix} x \\ y \\ z \end{bmatrix} + \begin{bmatrix} S_x^{(k)} \\ S_y^{(k)} \\ b^{(k)} \end{bmatrix}$$

Fig.8

$$\frac{\partial}{\partial a_1^{(k)}} \int_A [\ldots]^2 = \int_A [2a_1^{(k)} x^2 + 2a_2^{(k)} xy + 2a_3^{(k)} x \cdot g(x,y) + 2b^{(k)} x - 2x \cdot g(w_k(x,y))]$$

$$\frac{\partial}{\partial a_2^{(k)}} \int_A [\ldots]^2 = \int_A [2a_1^{(k)} xy + 2a_2^{(k)} y^2 + 2a_3^{(k)} y \cdot g(x,y) + 2b^{(k)} y - 2y \cdot g(w_k(x,y))]$$

$$\frac{\partial}{\partial a_3^{(k)}} \int_A [\ldots]^2 = \int_A [2a_1^{(k)} x \cdot g(x,y) + 2a_2^{(k)} y \cdot g(x,y) + 2a_3^{(k)} g(x,y)^2 + 2b^{(k)} \cdot g(x,y) - 2g(x,y) \cdot g(w_k(x,y))]$$

$$\frac{\partial}{\partial b^{(k)}} \int_A [\ldots]^2 = \int_A [2a_1^{(k)} x + 2a_2^{(k)} y + 2a_3^{(k)} g(x,y) + 2b^{(k)} - 2g(w_k(x,y))]$$

Fig.9

$$\begin{bmatrix} \int x^2 & \int xy & \int x \cdot g(x,y) & \int x \\ \int xy & \int y^2 & \int y \cdot g(x,y) & \int y \\ \int x \cdot g(x,y) & \int y \cdot g(x,y) & \int (g(x,y))^2 & \int g(x,y) \\ \int x & \int y & \int g(x,y) & \int 1 \end{bmatrix} \begin{bmatrix} a_1^{(k)} \\ a_2^{(k)} \\ a_3^{(k)} \\ b^{(k)} \end{bmatrix} = \begin{bmatrix} \int x \cdot g(w_k(x,y)) \\ \int y \cdot g(w_k(x,y)) \\ \int g(x,y) \cdot g(w_k(x,y)) \\ \int g(w_k(x,y)) \end{bmatrix}$$

Fig.10

$$e = \int_1^{2L} (g(x) - w(g(x)))^2 dx$$

Fig.11

$$\approx \sum_{i=1}^{L} (g_i - v_1(g_{2i}))^2 + \sum_{i=L+1}^{2L} (g_i - v_1(g_{2i-2L}))^2$$

Fig.12

$$= \sum_{i=1}^{L} (g_i - (a_1 + b_1 i + c_1 g_{2i}))^2 + \sum_{i=L+1}^{2L} (g_i - (a_2 + b_2(2i-2L) + c_2 g_{2i-2L}))^2$$

Fig.13

$$\frac{\partial e}{\partial a_1} = -2 \sum \{g_i - (a_1 + b_1 i + c_1 g_{2i})\}$$

$$\frac{\partial e}{\partial b_1} = -2 \sum i\{g_i - (a_1 + b_1 i + c_1 g_{2i})\}$$

$$\frac{\partial e}{\partial c_1} = -2 \sum g_{2i} \cdot \{g_i - (a_1 + b_1 i + c_1 g_{2i})\}$$

Fig.14

$$\begin{bmatrix} 1 & \sum i & \sum g_{2i} \\ \sum i & \sum i^2 & \sum i g_{2i} \\ \sum g_{2i} & \sum i g_{2i} & \sum g_{2i}^2 \end{bmatrix} \begin{bmatrix} a \\ b_1 \\ c_1 \end{bmatrix} = \begin{bmatrix} \sum g_i \\ \sum i g_i \\ \sum g_{2i} g_i \end{bmatrix}$$

Fig.15

$$\iint_{\overline{A}} f(x,y) = \frac{\sum_{k=1}^{4} J(t_k) d_k \iint_{\overline{A}} dx\,dy}{1 - \sum_{k=1}^{4} J(t_k) c_k}$$

Fig.16

$$\iint_{t_k(\overline{A})} f = J(t_k) \left\{ c_k \iint_{\overline{A}} + d_k \iint_{\overline{A}} dx\,dy \right\}$$

Fig.17

```
evaluate block_area and function_integral (equation Fig.16)
set all pixels in A to zero
for k₁ = 1 to 4 do
...
    for kM = 1 to 4 do
        compute w = w_k₁ ° ... ° w_kM
        calculate mapped_integral (equation Fig.17)
        for each pixel p in A do
            if p is in w(A) then
                increment greyscale of p by
                    (size of intersection) x mapped_integral
        end for p
    end for kM
end for k₁
```

Fig.18

```
find a set of initial points
plot the pixels corresponding to these points
initialize a queue with these points
repeat
    take pixel p from head of queue
    for each w_k which maps this parent block do
        round w_k(p) to the nearest pixel q
        if q has not already been plotted then
            find grey value and plot q
            add q to queue
        end if
until queue is empty
```

Fig.19

$$e_{ij} = \sum_{k=1}^{m} \sum_{l=1}^{n} c_{kl} \, p_{i+k \; j+l}$$

Fig.20

FRACTAL CODING OF DATA

BACKGROUND OF THE INVENTION

1. Field of the Invention

This invention relates to methods of fractal coding of data, such as image data or data representative of speech, and to apparatus for carrying out such methods.

2. Description of the Art

It should be understood that the term "data" is used in this specification in a non-limiting sense and is intended to include not only data in the form of binary-coded electrical signals but also any other forms of data or information. Such other forms of data or information may take a physical form other than an electrical signal and may represent any required phenomenon, such as an image, speech, numbers or shape.

Conventionally, an image displayed on a computer screen is stored or transmitted in the form of digital data characterising the position and tone or colour of each pixel of the screen display. A substantial storage capacity is required for such data. If the image is to be displayed at a remote location, the data is transmitted utilizing a suitable carrier this requires a substantial bandwidth to accommodate the data unless a long time is allowed for transmission. In some situations, where the displayed image comprises a regular geometrical shape, the only data which needs to be stored is data characterising an equation defining the geometrical shape and its position in the display. In this case, much less storage capacity is required for the data. Clearly, the latter technique can be used for storage or transmission of an Image only when the image can be suitably characterised by a mathematical equation.

It is already known that more complex images can be coded by the so-called Adaptive Discrete Cosine Transform (ADCT) technique, and this technique is assured of adoption as the JPEG standard for still image compression (G. K. Wallace, "The JPEG Still Picture Compression Standard", Comm. ACM, Vol. 34, No. 4, pp 30–44, 1991).

However, there has also been continuing interest shown in the characterisation of complex images by fractal coding (M. F. Barnsley and S. Demko, "Iterated Function Systems and the Global Construction of Fractals", Proc. Roy. Soc. London, Vol. A399, pp 243–275, 1985).

A fractal is a structure having a high degree of self-similarity in that it is composed of a basic motif which is repeated throughout the structure and which may be considered as being formed by a series of transformations, which may include translation, rotation, reflection, size reduction or skewing, applied to the motif in order to generate successive parts of the structure. In fractal coding of an image, the image is coded by means of a fractal transform which breaks the image down into a series of domain blocks, each of which may be related to another part of the image by an affine map which may then be stored as an equation.

A. E. Jacquin, "A Novel Fractal Block-Coding Technique for Digital Images", Proc. IEEE ICASSP, pp 2225–2228, 1990, discloses a fractal coding technique which treats each image block as a "range block", and utilises a searching process, which is costly in terms of processing time and complexity, to find domain blocks having an affinity with the range blocks. However, this technique relies on good matches being found between the range blocks and the domain blocks, and significant degradation in image quality occurs if good matches are not found.

SUMMARY OF THE INVENTION

It is an object of the invention to provide a novel fractal coding method and apparatus in which coding efficiency is high and substantial compression is obtained while retaining good fidelity. Aspects of the invention include coding an image or other data and storing, transmitting and decoding the data as well as methods, systems and apparatus therefor.

According to the present invention there is provided a method of fractal coding of data, which comprises dividing data into domains, determining a set of transformations relating the domains to the data in such a manner as to minimize the error between the data and an approximation to the data obtained by application of the transformation, and providing an expression of a series of quantised fractal coefficients characterising the transformations.

This method has a wide field of application, and may be used for coding data or information in various physical forms representing various phenomena. Other important fields of application apart from coding of image data include coding of speech and handwriting and even coding information representative of the shape of an object.

A transformation may be characterised in two or more parts, at least one part indicating a domain and at least another (functional) part indicating a value for a measure associatable with a specific domain or aspect thereof.

The set of transformations utilized in this method may be termed the Bath Fractal Transform (BFT) and corresponds to any solution which minimize the error $d(f,g)$ between one or more functions g (whether continuous or discrete) and an approximation f to the function or functions expressed as a so called Iterated Function System (IFS), which is a standard representation for deterministic fractals. The IFS may be divided into a domain part and one or more functional parts.

The transformatioms may be determined analytically and preferably without recourse to searching. The transformation coefficients may be found from a set of linear equations. The transformation coefficients may be derived in linear time. The transformation coefficients may be the result of a linear relationship between coding complexity and image size.

The series of quantised fractal coefficients provided may be held in a store or sent over a transmission path.

Furthermore the stored or transmitted coefficients may be retrieved or received as appropriate and a representation or simulation of the data reproduced therefrom.

In a preferred embodiment of the invention the set of transformations is determined by a least squares approximation to the data.

The invention is particularly applicable to the fractal block coding of images, in which case the image is divided into image blocks and data representative of each image block is divided into a plurality of domains which are related to the image block by a set of affine transformations.

In this case, each image block is generally rectangular, although the sizes and shapes of the domains may vary relative to one another.

In one embodiment of the invention, each image block is divided into a plurality of equal non-overlapping domains for the purpose of image encoding, although it should be appreciated that in some applications it may be preferred that the domains are of different sizes so as to optimize the distribution of error between the different domains of an image block or reduce the total error of the image block.

For coding of grey-scale images, the block data may include grey-scale data as well as positional data. In which case, the set of transformations is determined both on the basis of the positional data and on the basis of the grey-scale data. For coding of color images, color data will be included instead of or in addition to grey-scale data.

The invention also provides a fractal coding apparatus for fractal coding of data, the apparatus comprising partitioning means for dividing the data into domains, transform means for determining a set of transformations relating the domains to the data in such a manner as to minimize error between the data and an approximation to the data obtained by application of the transformations, and quantisation means for providing an expression of a series of quantised fractal coefficients characterising the transformations.

The coding technique of the invention is straightforward to implement and, when applied to coding of images, can provide a worthwhile compression of image data, typically of the order 12:1. The technique is particularly advantageous in terms of its computational efficiency (which is linearly proportional to the number of image pixels), which will make it particularly useful in systems requiring fast coding without the use of highly complex coding apparatus. As well as being usable in image coding applications requiring digital coding and compression of still images, such as in image archiving or multi-media systems, the technique is also usable in image coding applications in which moving images are to be encoded and decoded in real time, such as in a video mail system.

The invention further provides a method of approximating information for storage or transmission in reduced form, the method including the step of providing a function expressing the information and deriving therefrom said reduced form as an iterated function system having a domain part and a functional part.

The invention also provides a method of forward processing of a fractal from its code including deriving the fixed points of all the transformations needed for the fractal, forming a rounded approximation pixel for each point, and plotting the pixels as a finite approximation to the attractor of the fractal.

The method may include the step in which only one pixel is plotted for each rounded approximation. The number of calculations may be linearly related to the finite number of pixels in the approximation. The method may include for a fractal function assigning to a whole pixel the first value of the function calculated for a point within the pixel. The method may provide for closedly approximating the overall value of a fractal function for a pixel including selecting an integral number of tiles (M) approximately equal to the number of pixels, evaluating the integrals of the fractal function over the M tiles and determining the value of the function for a pixel as the weighted sum of said integrals over the tiles it intersects, the weighting being in proportion to the sizes of siad intersections. In a form of the method in which a completely tiled image is tiled by tiles at least one of which is not within the parent block for the tile, the method may include providing seed pixel values adequate in quantity to cause all parts of the image to be visited.

According to yet another aspect of the invention there is provided a method in which domains are not all of one size, the size being chosen in accordance with a measure value over the data to equalise the measure value among the domains.

The measure value may be a prediction of coding errors determined by passing the data through a filter to provide an error assessment output.

The invention also provides a storage medium recorded with a fractal coding of data in accordance with the above techniques.

The invention also provides an apparatus to decode fractally coded data including means for determining a finite number of pixels all containing a part of the attractor and means for plotting each of the finite number no more than once.

The invention also provides a system for the fractal coding of data, the storing and/or transmission of coded data and the decoding of said fractal coding after said storing and/or transmission to reconstitute said data including coding the data and decoding the coding in accordance with the above techniques.

BRIEF DESCRIPTION OF THE DRAWINGS

In order that the invention may be more fully understood, data handling techniques and more specifically an image coding technique in accordance with the invention will now be described, by way of example, with reference to the accompanying drawings, in which.

DETAILED DESCRIPTION OF THE PRESENTLY PREFERRED EMBODIMENTS

Figure 1:
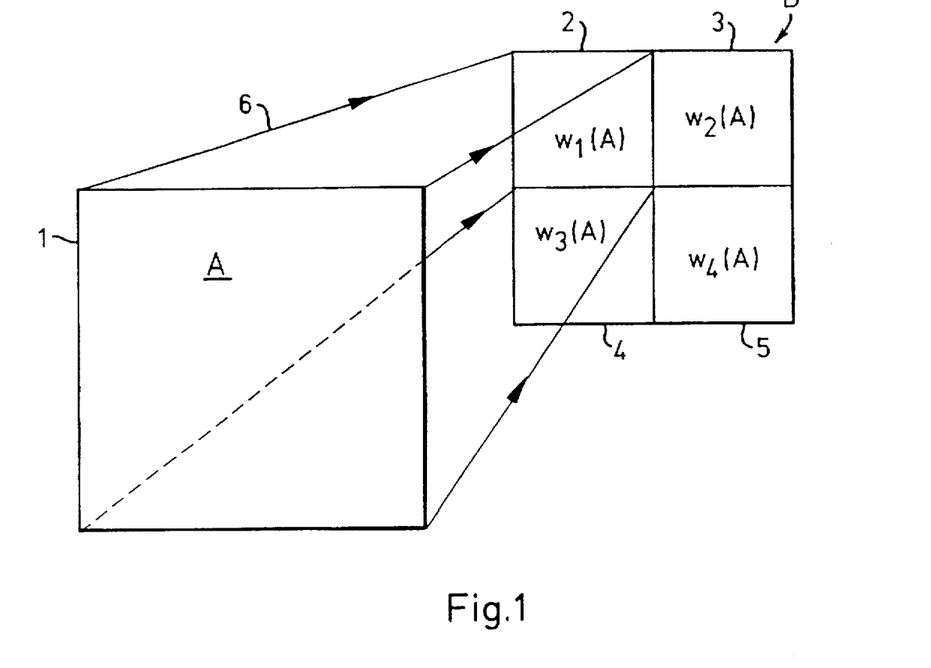
FIG. 1 is a schematic representation of an image block to be coded.

In the image coding technique given by way of example and shown schematically in FIG. 1, a set of four affine transformations $W_1(A)$, $W_2(A)$, $W_3(A)$ and $W_4(A)$ gives a least-square approximation to a rectangular image fragment 1. The transformations define four non-overlapping rectangular domains 2, 3, 4 and 5 which cover the image fragment 1, the mapping of the image fragment 1 onto the domain 2 by means of size reduction and displacement being indicated schematically in FIG. 1 by four lines 6 by way of example. Each domain 2, 3, 4 and 5 may then itself be mapped by a similar series of four transformations. The image fragment 1 is typically an 8 by 8 pixel block.

A system of affine transformations $\{w_k: k=1,2, \ldots \}$, mapping a point $V=(x,y)$ in the Euclidean plane, can be written as $$w_k \cdot V \rightarrow T_k V + S_k$$

$T_k$ is a contractive linear mapping with $|T_k|<1$ and $S_k$ is a shifting vector.

Figure 6:
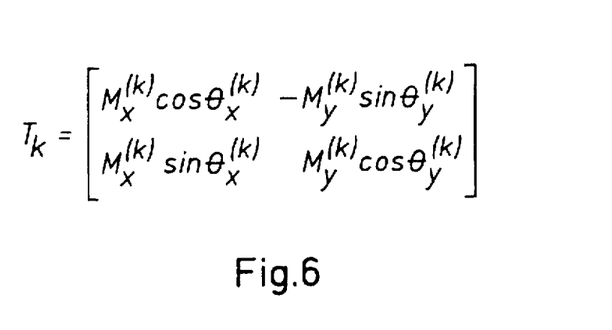
FIGS. 6 to 20 are equations and other expressions referred to in describing the techniques according to the invention.
Figure 7:
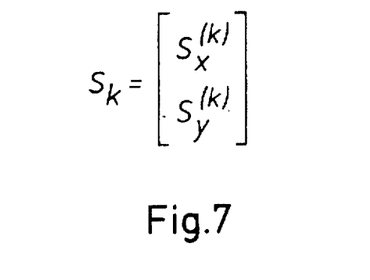

$T_k$ and $S_k$ are shown in FIGS. 6 and 7 respectively.

This defines the domain part of the image coding process of this example.

Geometrically, $M_x$ and $M_y$ are x and y magnifications, $\theta_x$ and $\theta_y$ are rotations and $S_x$, $S_y$ are shifts that together make up a transformation w. Where there are N affine transformations, this is termed a Self Affine System (SAS) of order N. Associated with an SAS is a unique attractor set which, in general, contains infinitely many points. The attractor set is a fractal, in the sense that it satisfies a self-similarity property, and often has non-integer fractal index. For graphical purposes, there is a finite set of pixels which covers the attractor, and which may be constructed by one of a number of algorithms.

For coding of grey-scale variation over the image, the SAS is extended into a third dimension z in order to define the functional part of the image coding process. Thus, where A is the attractor of an SAS in the plane, an extended SAS may be defined by transformations, shown in FIG. 8.

Figure 8:
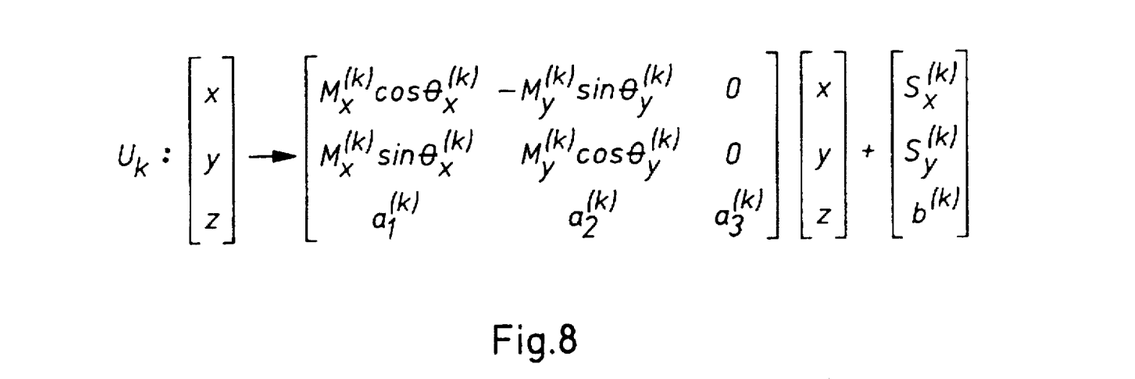

If A satisfies a non-overlapping condition, and if $|a_3|<1$, then the attractor of this SAS is a fractal surface which represents grey-scale variation over the image.

The image is coded by partitioning it into a series of rectangular blocks, in which the grey-scale is approximated by an SAS of the form defined above, giving the fractal block coding for the image. An SAS whose domain attractor is the rectangle is easy to define (FIG. 1); the problem is to find the coefficients $a_1$, $a_2$, $a_3$, b which define the best fractal approximation to the grey-scale function of the image block.

Figure 9:
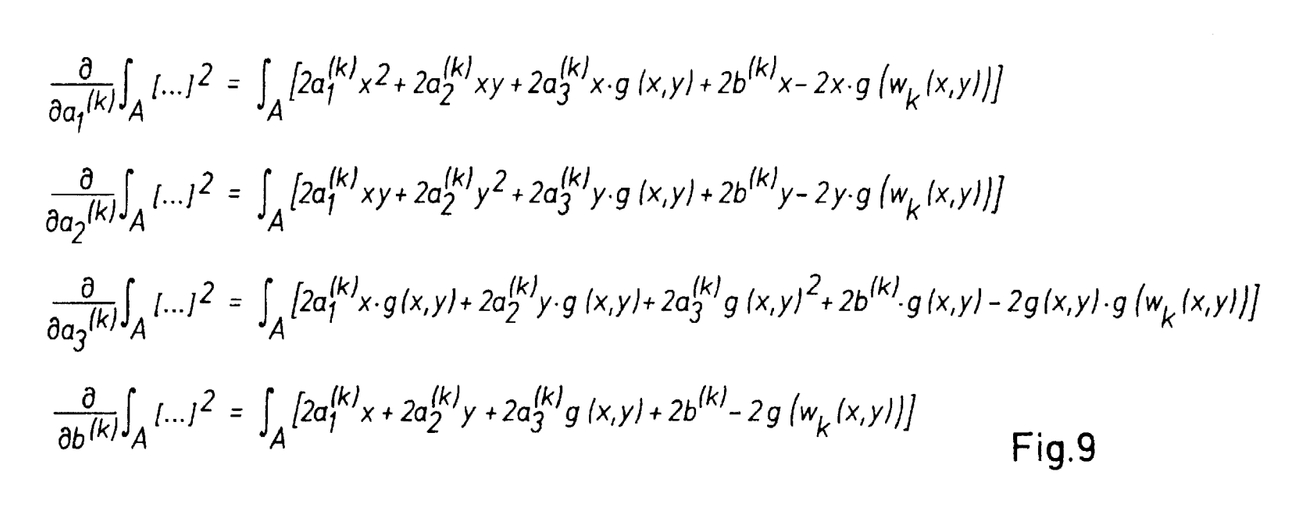
Figure 10:
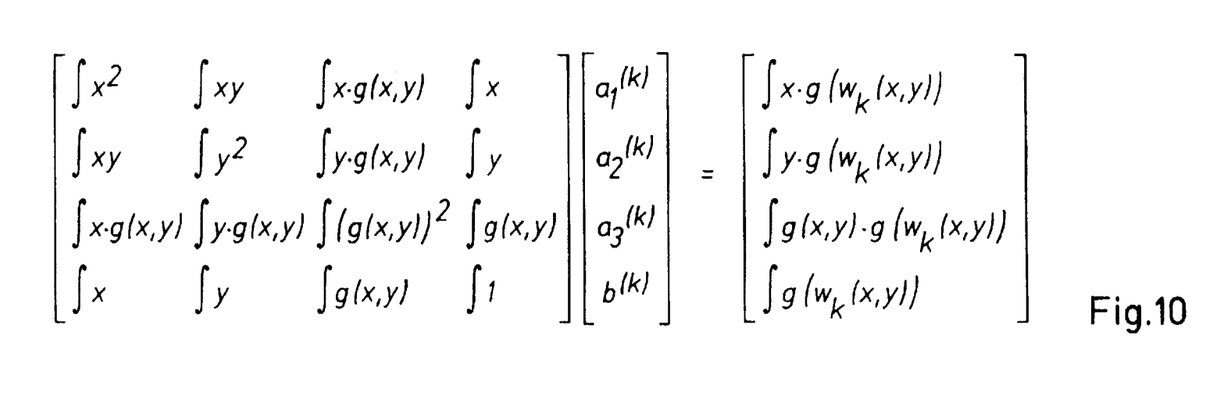

If g is the grey-scale function for the given image, so that g(x,y) is the grey-scale value of the pixel at (x,y), the root-mean-square difference between the image and its mapping by the SAS of equation |1| may be minimized by minimizing $$\int_{(x,y)\in A}[g(w_k(x,y))-a_1^{(k)}x-a_2^{(k)}y-a_3^{(k)}g(x,y)-b^{(k)}]^2 dH$$

for each k=1, . . . , N, where H is the Hausdorff measure over A. The partial derivatives with respect to the fractal parameters are shown in FIG. 9 and are all zero at the minimum. From the expressions in FIG. 9 the expression in FIG. 10 can be derived. In FIG. 10 all the integrals are over A with respect to the Hausdorff measure. The equation in FIG. 10 may then be solved to obtain $a_1^{(k)}$, $a_2^{(k)}$, $a_3^{(k)}$, $b^{(k)}$.

In this case, a function of two variables is approximated by a fractal function by a least squares approximation. A similar technique may be applied to functions of any number of variables, and is applicable to speech approximation.

Thus, the least squares approximation to an image block tiled according to this scheme requires the solution of four sets of four linear equations for each block. It should be noted that defining $a_3^{(k)}=0$ is equivalent to describing tile k by a planar facet. The least squares fit of an image by planar surfaces is thus a special case of this approximation method, and the coefficient $a_3$ can be visualized as the parameter which introduces texture into the tile which may be termed the "fuzz factor".

Since different $w_k$ give different fractal solutions, various optimisations of the rectangular tiling may improve the fractal approximation. These include locating the optimum splitting point of a block to give non-equal tiles, and selecting the best rotation of each tile within a block through multiples of $\pi/2$.

The fractal coefficients are real-valued and must be quantised before storage or transmission. However, the lack of absolute bounds for the coefficients complicates the analysis of possible quantisations.

The problem is simplified by computing a suitable set of function values from which the fractal coefficients can be recovered. This may be done by storing $f(\alpha_k)$, where $\alpha_k$ is the fixed point of $w_k$, which is always a corner of the block, together with the values of $f(w_i(\alpha_k))$; $i \neq k$, so that the sixteen fractal coefficients are replaced by sixteen function values. The fractal coefficients may be recovered from the function values by solving four sets of four linear equations. Since the function values are the grey-scale values of the fractal approximation, their range is just that of the original image. They may thus be more easily quantized to integers.

To achieve further compression, the quantized function values are stored in blockwise sets. In each block, one function value is stored explicitly, and the other values are stored by their differences. Statistical coding, such as Huffman or Entropy coding, can then be performed on the set of differential values, to give a final encoding for the image approximation.

In a test, the least squares approximation according to the equation in FIG. 10 has been applied to an 8 by 8 pixel image block, taken from the standard test image "Gold Hill" with intensity component digitized at 8 bits per pixel, and with $M_x^{(k)}=M_y^{(k)}=\frac{1}{2}$, $\theta_x^{(k)}=\theta_y^{(k)}=0$ for all k, and $S_x^{(k)}$, $S_y^{(k)}$ so that the four non-overlapping tiles generated are of equal size. Variations of this technique have also been used, such as matching of the image block by planar facets, $a_3^{(k)}=0$. An improvement may be achieved by optimising the $M_x$ and $M_y$ as well as by optimising $\theta_x$ and $\theta_y$.

The approximation method described may be used to block code a complete digital image. Given a partitioning of an image into rectangular blocks, each block may be individually approximated by a fractal. Partitioning of the image into constant-sized blocks may result in uneven distribution of error, but to find the optimal partition (that which gives the least overall degradation) requires a prohibitively large search if standard evaluation techniques are used. Evaluation methods for estimating suitable partitions at reasonable computational cost are described elsewhere in this specification.

Figure 2:
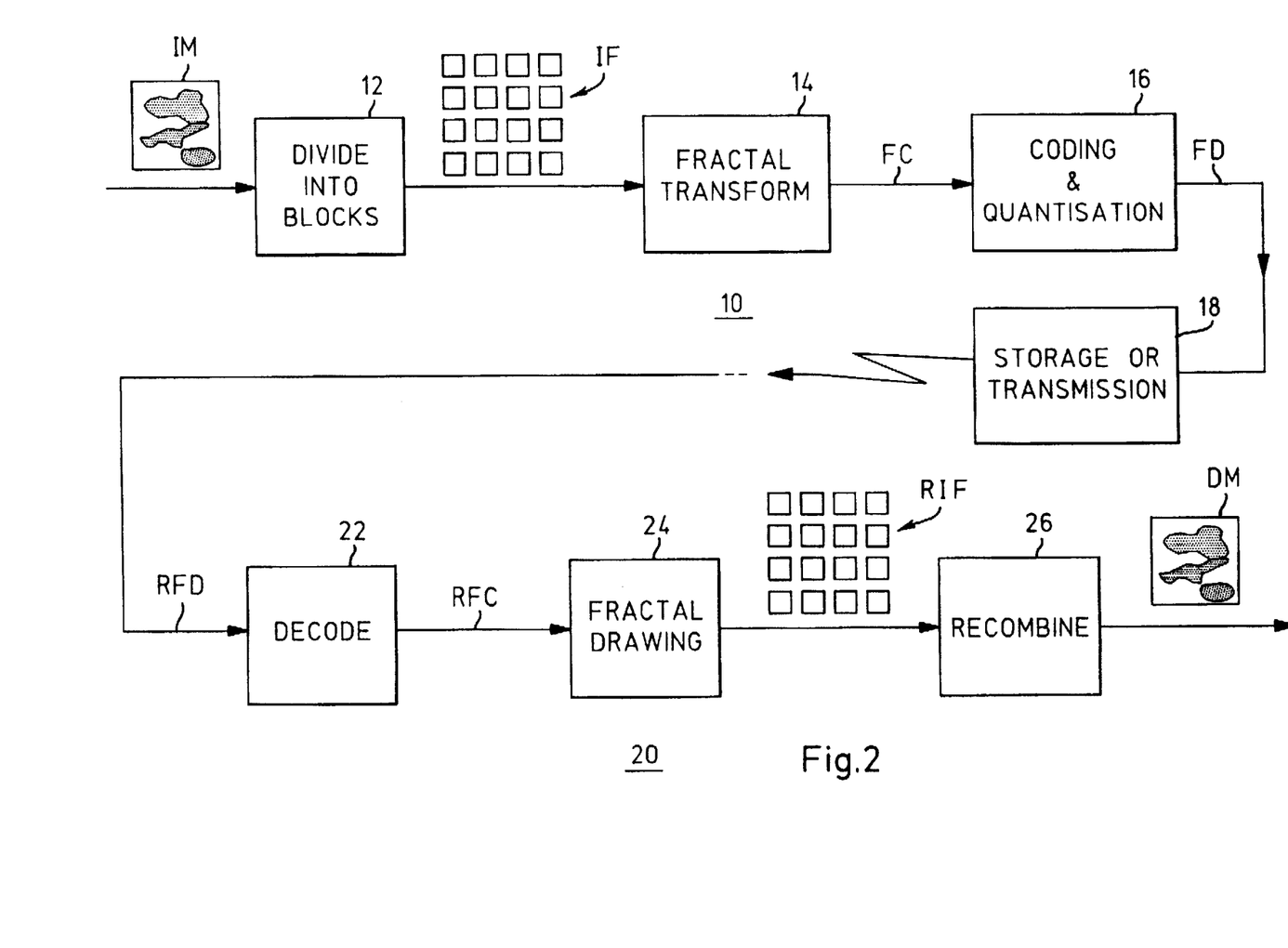
FIG. 2 is a block diagram of a coding/decoding apparatus according to the principles of the present invention.

FIG. 2 is a block diagram illustrating in its upper part, the coding system 10 used for carrying out such image coding, and in its lower part, the decoding system 20 used for subsequently decoding the image. The coding system 10 comprises a partitioning unit 12 for dividing the image IM into rectangular image fragments IF, and a fractal transform unit 14 for determining the fractal function for coding each image fragment by a least squares approximation as described above. The fractal coefficients FC characterising the function are then supplied by unit 14 to a coding and quantisation unit 16 in which the coefficients are coded and quantised to produce as an output of unit 16 the fractal code FD for storage or transmission on a suitable transmission path or storage medium, represented by unit 18.

Subsequent decoding of a stored or transmitted fractal code RFD to reproduce the image requires that the code be supplied to a decode unit 22 of the decoding system 20 which recovers the fractal coefficients RFC by the technique referred to above. The recovered fractal coefficients are then supplied to a fractal drawing unit 24 which reproduces the coded image fragments RIF from these fractal coefficients and supplies the image fragments to a recombining unit 26 which reproduces the complete decoded image DM.

Tests were carried out utilizing such a system to code and decode the two standard images "Gold Hill" and "Barbara 2". The original images were sampled at 576 row by 720 column resolution, which were partitioned into 72 by 90 blocks of 8 by 8 pixels. For each block the optimum combination of rotation and magnification was determined. Only the luminance coding was effected, although a simple extension to encoding of the colour components will be readily apparent to those skilled in the art.

Examples of the degradation introduced by the ADCT algorithm were also obtained for the images "Gold Hill" and "Barbara 2". Table 1 compares the fractal codes and ADCT codes.

TABLE 1

| Standard Test Picture | RMS Error 15:1 ADCT Code | RMS Error Fractal Code |
|---|---|---|
| Gold Hill | 5.78 | 5.96 |
| Barbara 2 | 8.42 | 10.04 |

Thus, the above described least-squares technique for fractal approximation is clearly a feasible approach to image coding. The approximation is found by solving a set of linear equations whose coefficients may be found in linear time so that the technique is straightforward to implement. The time for such calculation is believed to be much more predictable than for the techniques depending on a searching process. A conservative estimate of the compression that can be achieved with 72×90=6480 blocks of variable size is 8:1. At this compression, present tests show inferior quantitative fidelity to the result which may be obtained with ADCT coding, as is to be expected at this early stage of development. Optimisations will improve the fidelity of the fractal code and yield higher compression ratios and such developments will be apparent to those skilled in the art. Fractal approximation is therefore comparable with the ADCT.

However, this technique also has the advantage of a linear relationship between coding complexity and image size (in terms of the total number of pixels) in that the computational cost of approximating an image block is proportional to the number of pixels in the block. In Jacquin's fractal algorithm, a search is required in the encoding stage, whereas the decoding is identical. The present technique is more symmetrical than the Jacquin algorithm, as each block can be encoded and decoded in linear time.

Thus this technique represents an efficient image approximation method with fast coding and very fast decoding. It is most suitable for applications where coding efficiency is a priority, in particular in interactive situations. Video mail may prove to be its most promising application; moving images could be encoded with a fixed partition scheme, and differential quantisation of the fractal coefficients over a sequence of images would provide low bit rates. In one arrangement embodying the invention, images are transferable at 12 frames per second between one conventional personal computer and another similar device over a network connection. By optimisation using techniques readily apparent to those skilled in the art, a connection capacity of some 64 kilobyte is expected to be adequate for this and even for higher frame rates.

It should be understood that the above-described image coding technique is only given as an example of one application of the method of fractal coding in accordance with the invention. In fact the method of the invention has a very much wider field of application as will be appreciated by referring to the following general theory relating to the invention.

General Theory

The Bath Fractal Transform (BFT) is any solution which minimize an error measurement $d(f,g)$ between one or more continuous or discrete functions g and an approximation to them f expressed as an iterated function system which can be divided into a domain part and one or more functional parts.

An example is the approximation to a color image by defining the color components Y,U,V (or any other representation) as invariant functions over a tiling of the plane.

Suppose $f(x_1, x_2, \ldots x_{N-1})$ is a function of N−1 variables, then $(x_1, x_2, \ldots x_{N-1}, f)$ is a point in N dimensional space which can be defined by an N dimensional iterated function system.

An iterated function system (IFS) w of order M is a collection of M functions $\{w_i : i=1,2 \ldots M\}$. The IFS may be applied to a function f to transform it to a new function f' as $$f' = \bigcup_i w_i(f)$$

If f'=f, the function is invariant and it is shown in the literature that a unique invariant function f exists under suitable conditions of contractivity of w.

The BFT uses an (IFS) to describe both an invariant function $f(x_1, x_2, \ldots x_N)$ and its domain. If the IFS is separated into a domain part t and a function part v, then the invariant function is:

$$\begin{pmatrix} x_1 \\ \cdot \\ \cdot \\ \cdot \\ x_{N-1} \\ f \end{pmatrix} = w \begin{pmatrix} x_1 \\ \cdot \\ \cdot \\ \cdot \\ x_{N-1} \\ f \end{pmatrix}$$

which can be expressed as $$\begin{pmatrix} x_1 \\ \cdot \\ \cdot \\ \cdot \\ x_{N-1} \\ f \end{pmatrix} = t \begin{pmatrix} x_1 \\ \cdot \\ \cdot \\ \cdot \\ x_{N-1} \\ f \end{pmatrix}$$

which is the domain part independent of f, and $$f = v(x_1, x_2, \ldots x_{N-1})$$

which is the functional part.

As an example, for a waveform which is a two dimensional single valued invariant function of a single variable X, the domain could be $-1 \leq X \leq 1$, divided into two equal regions. The function could be a polynomial in both X and g. This would provide an IFS of order 2 in 2 dimensions:

$$(w_1) = \begin{pmatrix} t_1 \\ v_1 \end{pmatrix} \quad (w_2) = \begin{pmatrix} t_2 \\ v_2 \end{pmatrix}$$

in which $$t_1 = x/2 - 1/2 \qquad t_2 = x/2 + 1/2$$
$$v_1 = a_0 + a_1 x + a_2 x^2 \ldots + \qquad v_2 = c_0 + c_1 x + c_2 x^2 \ldots +$$
$$b_1 f + b_2 f^2 \ldots \qquad d_1 f + d_2 f^2 \ldots$$

The invariant function Y for which $$Y = w(Y)$$

could be an approximation to discrete samples of speech, or some continuous function. The various $a_i$, $b_i$, $c_i$, $d_i$ are the parameters of the functional part of the IFS.

To obtain the BFT for a given function $g(x_1, \ldots X_N)$ define an error measurement $$d_{BFT}(f,g)$$

As an example, $d_{BFT}$ could be the sum of squares of the difference between samples of f and g.

$$d_{BFT} = \sum_{k=0}^{a} (gk - fk)^2$$

Apply the error measurement to the function f to be approximated and its transformation w(f):

$$e_{BFT} = d_{BFT}(g, w(g))$$

To obtain the BFT, find the minimum of e with respect to the parameters of the IFS w, $\alpha_i$. This minimum corresponds to solving the series of equations equating the derivative of $d_{BFT}$ with respect to the IFS parameters $a_i$ to zero:

$$\frac{\delta_{BFT}}{\delta \alpha_i} = 0, \text{ over all } \alpha_i$$

The solution so obtained for the $\alpha_i$ defines an IFS $w_{BFT}$ whose invariant function Y is an approximation to g. $w_{BFT}$ is the Bath Fractal Transform.

Figure 3:
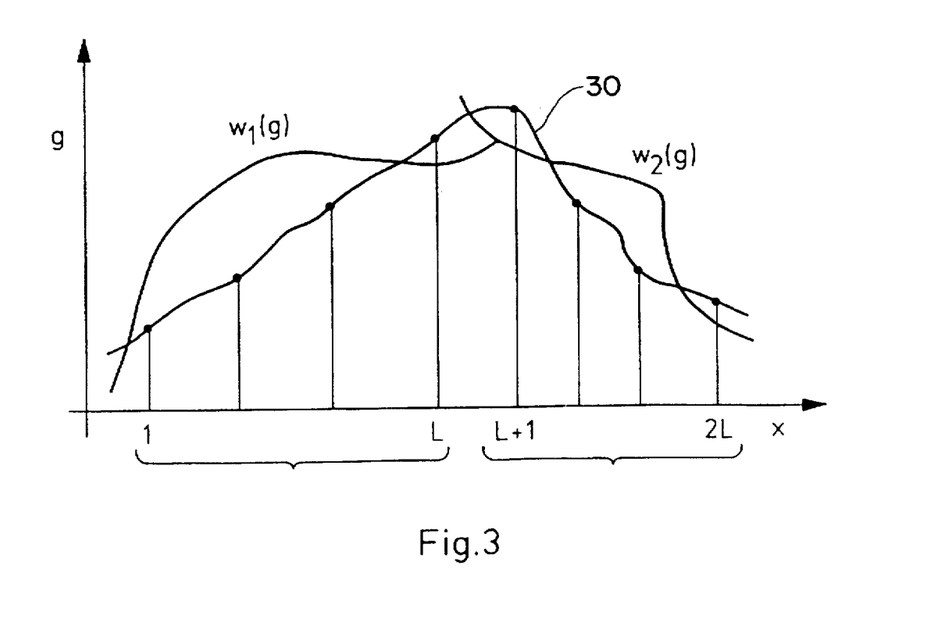
FIG. 3 is a schematic representation of a waveform to be coded.

In order to illustrate the use of this technique further, a particular example of one way in which the technique may be applied to approximation of a waveform, such as a speech waveform, will now be described with reference to FIG. 3. It should be understood that there are other ways utilizing other domains and/or functions in which such an approximation may be made.

In this case the waveform 30 is approximated by two iterated function systems $w_1(g)$ and $w_2(g)$ where:

$$w_1(g) = \begin{pmatrix} t_1 = X/2 \\ v_1 = a_1 + b_1 X + c_1 g \end{pmatrix} \quad w_2(g) = \begin{pmatrix} t_1 = X/2 + L \\ v_2 = a_2 + b_2 X + c_2 g \end{pmatrix}$$

The problem is to determine the a,b,c.

Figure 11:
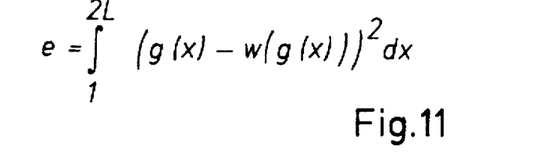
Figure 12:
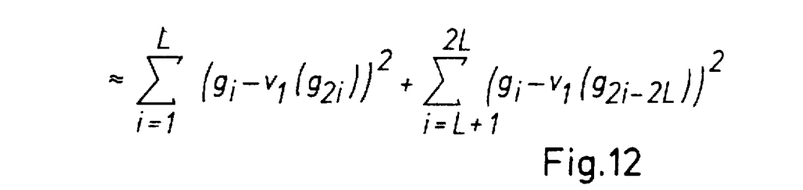
Figure 13:
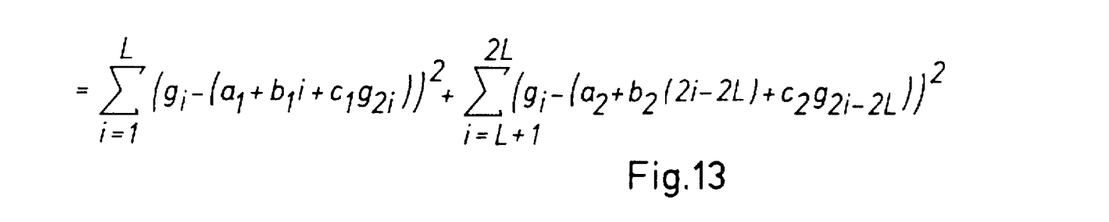
Figure 14:
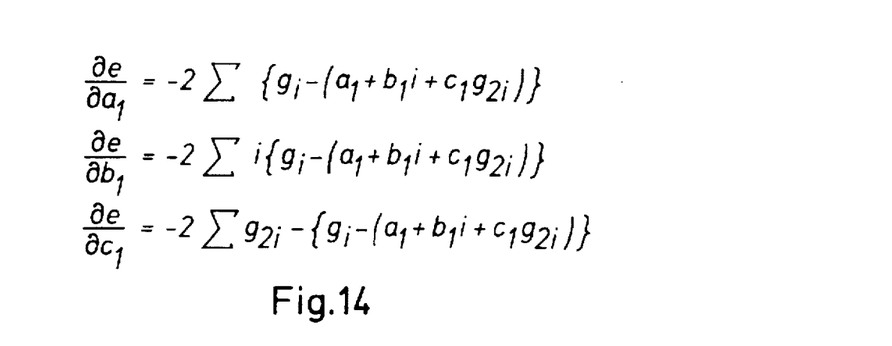
Figure 15:
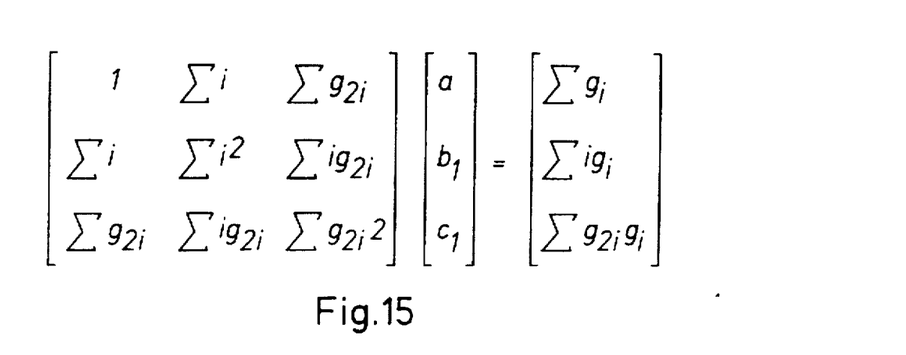

To this end, define the error measure, shown by the equation in FIG. 11, which by summation is approximately as shown by the equation in FIG. 12 and which in turn can be expressed as shown in FIG. 13. Then do the differentiations as shown in FIG. 14. Equating to zero at the minimum gives the solution for $a_1$, $b_1$ and $c_1$ shown in FIG. 15, with a very similar solution for $a_2$, $b_2$ and $c_2$.

It is only the $c_i$ which makes this "fractal".

Figure 4:
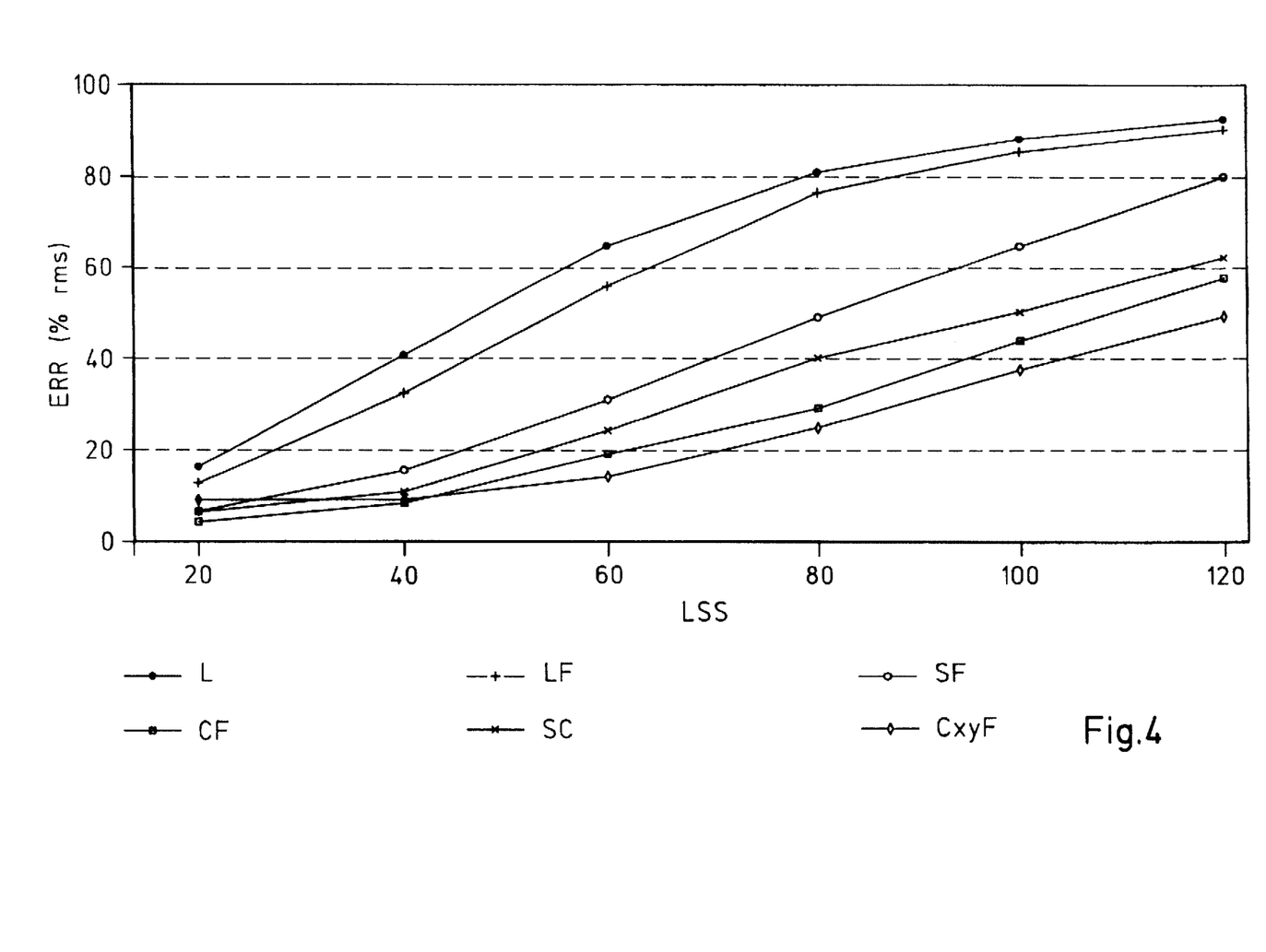
FIGS. 4 and 5 are graphical representations of error in coding of speech.
Figure 5:
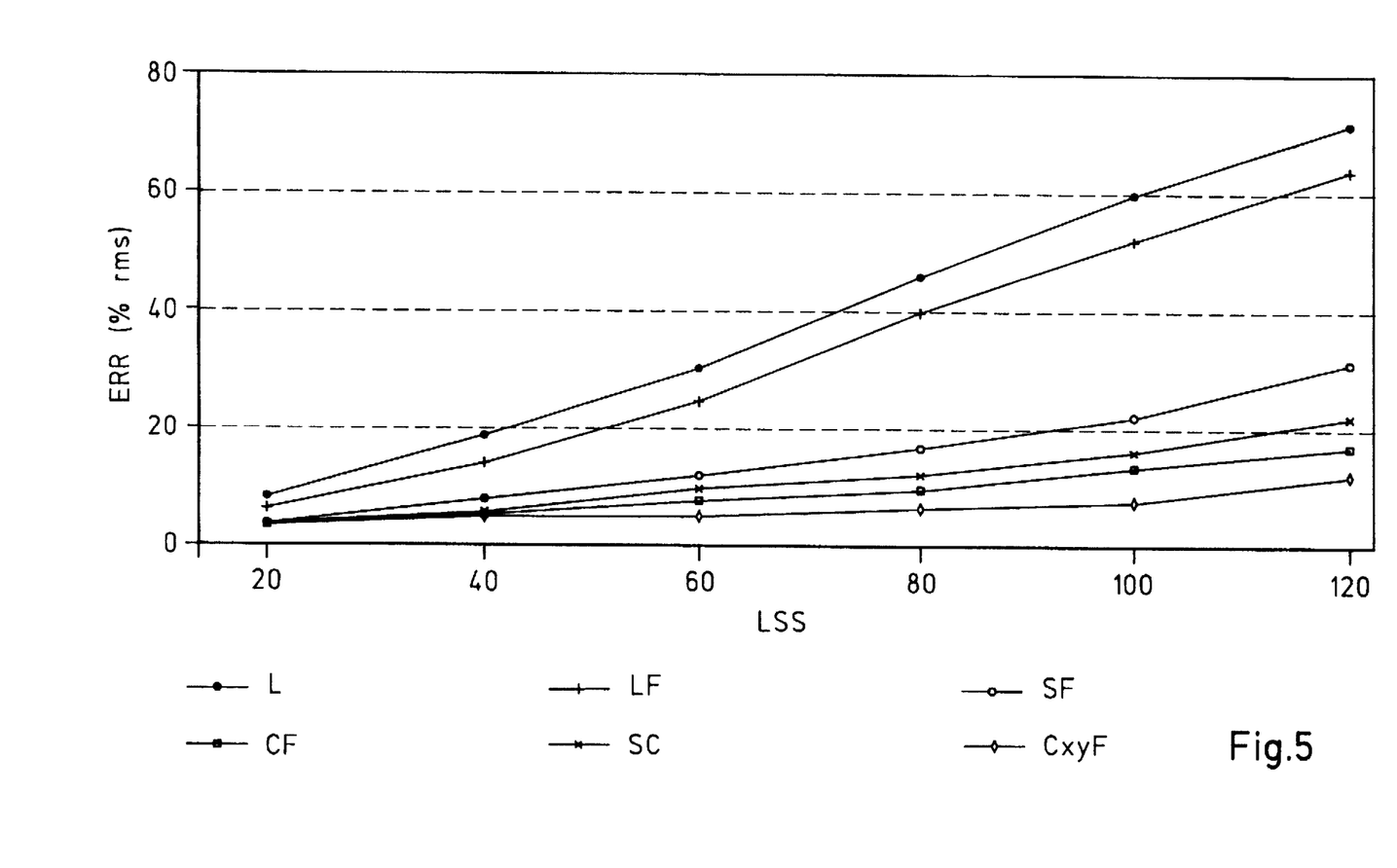

FIGS. 4 and 5 are graphical representations of the mean percentage rms errors ERR against length of speech sample between speech and reproduced speech after coding by means of various coding techniques, for the sounds "do" and "an" respectively. In FIG. 4, the sound "do" is from the sound of the word "dog" pronounced in English, while in FIG. 5 the sound "an" is similarly from the sound of the word "and" pronounced in English. In FIG. 4, the signal is 4000 samples of voiced 22050 Hz speech, in FIG. 5, the signal is 2500 samples. Curve L is for linear fit (non-fractal), curve LF for linear fractal, curve SF for square fractal, curve CF for cubic fractal, SC for standard cubic (non fractal) and CxyF for cubic x and y fractal. It will be seen that best results are obtained with cubic fractal coding and cubic x and y fractal coding.

The "inverse" problem, considered above, is that of discovering a fractal code to describe an image, for example as a collage of transformed copies of itself. Clearly, when a fractal has been produced, for example to provide a compressed image record, a technique is needed to recover the image. The "forward" problem is the graphical rendering of a fractal from its code.

The Iterated Function System (IFS) defines fractals constructed by a collage of transformed (e.g. reduced and/or rotated) copies of an image in terms of contraction mappings, as is well-known from the works of Barnsley, e.g. U.S. Pat. No. 4,941,193 and 5,065,447 and the book "Fractals Everywhere" Academic Press New York 1988, incorporated herein by reference.

Barnsley and Demko (Proc. Roy. Soc. Lond., Vol. A399, pp243-275, 1985 ibid.) describe a probabalistic method which is capable of producing an effective approximation very rapidly and, after much longer, may run to completion. This and other well-known techniques, e.g. a deterministic algorithm (Fractals Everywhere, ibid.) could eventually produce a display on a computer operated vdu of infinitely many points. However infinite resources may be needed.

An adequate approximation which uses less resources (equipment, time, program complexity) is desirable. Such approximations are now proposed:

a) finding every pixel which contains a part of a fractal, however small, and no others (this would be the minimum set of pixels which covers the fractal), b) finding every pixel which contains a particular proportion (or measure) of the fractal.

These approximations are called rendering. The particular proportion can be displayed as an appropriate color or greyscale level.

The present invention provides an algorithm to perform a minimal number of arithmetic operations to construct an approximate fractal. Further forms of algorithm provide rendering of colour and grey scale.

Techniques of producing the fractal coding of an image are now widely known and will not be described further.

One known "forward" algortm is the Random Iteration Algorithm (see "Fractals Everywhere", ibid.). In this algorithm from an arbitrarily chosen initial point successive points are computed by applying randomly chosen mappings from the IFS (above). These points approach the "attractor" of the fractal, only a few early points need to be discarded. The lower bound of the number of iterations to only cover the attractor with pixels found by computing points can be calculated but there is not any definite stopping criterion. Thus, adequate quick illustrations of attractors can be produced. Also, this algorithm is needed to render small parts of highly magnified fractals, albeit very slowly in many cases. Further, this algorithm can eventually find almost all pixels in an attractor in real cases. The weakness of the RIA is exemplified by a test to develop a spiral. The fractal needs 57518 pixels (from other algorithms). After about 670000 iterations, in this example, only about 73% had been drawn. One reason is that many pixels have been visited frequently (up to 255 times for one pixel when 38106 pixels have yet to be visited) while computing points.

Another known form is the Deterministic Iteration Algortihm, (see "Fractals Everywhere", ibid.). This uses sets of points rather than single points. After many iterations the sets of points approach the attractor. However, two buffers are required, for successive iterations. As the sets of points are replaced with discrete approximations, errors accumulate in successive iterations and in some cases the whole attractor is not constructed, some sets of points never being poduced. Also magnified fragments can not be rendered with the DIA.

It is proposed that an algorithm which operates explicitly on pixels, not points, be used and that only a representative set of pixels be found. This set would be finite so constructible in finite time.

This proposed algorithm, the Minimal Plotting Algorithm (MPA), starts with finding the fixed points of all the transformations for the production of the fractal ($w_k$ above). The pixels corresponding to these points are plotted. For an initial pixel p for values k=1 to N, $w_k(p)$ is rounded to nearest pixel q. (N is the order of the IFS). If q has not already been plotted it is plotted. Pixel q is then put at the end of a queue formed the pixels corresponding to the fixed points. The process terminates when the queue is empty.

The upper bound of the accuracy of the MPA is definable. The rendering $R_A$ is all pixels which contain a part of the attractor, however small. The MPA generates a set of pixels which is an approximation to $R_A$. The distance from a pixel p to $R_A$ is defined as:

$$\rho(p, R_A) = \min_{q \in R_A} d(p, q)$$

where d is some metric in the plane, usually the Euclidian metric.

When $\delta$ is the diameter of a pixel in the metric d then, for all pixels p generated by the MPA, $$\rho(p, R_A) \leq \frac{\delta}{1-s}$$

where s is the maximum contraction ratio of the IFS mappings $w_k$.

By induction, the last statement can be proved, and relates to the proximity of plotted pixels to those of $R_A$. This is referred to as the Proximity Theorem.

The performance of the MPA can be demonstrated as follows, using an example based on the Sierpinski triangle. Using the DIA the number of pixels in $R_A$ can be estimated. The display screen has 1024×1024 pixels (i.e. 1048576 pixels) and the initial set is this square, the smallest bounding box for the attractor. Each affine transformation has contractivity ¼, so that each iteration give ¾ the number of pixels. (Alternatively, the construction can be regarded as removing ¼ of the the pixels at each iteration). After nine iterations of the DIA, further iterations do not remove any more pixels. Thus, $R_A$ is $1024^2 \times (¾)^9 = 78732$. The MPA plots 101258 pixels, about ¼ more than needed, the propagation of rounding error giving an inaccurate approximation. However, since s=¼, no pixel plotted is more than $$\frac{1}{1-1/2} = 2$$

pixels from $R_A$, thus the accuracy remains good.

Important results from the Proximity Theorem are the Termination Property and the Optimality Property.

The Termination Property: The attractor is a bounded set $R_A$ and thus contains a finite number of pixels. The MPA plots a finite number of pixels. The MPA plots each pixel just once, therefore the algorithm will terminate in finite time.

The Optimality Property: The rendering constructed by the MPA is invariant, that is transforming any pixel give another pixel in that rendering. If P is the number of pixels in this rendering then the minimum number of plot operations required is P and the minimum number of transformations required to establish invariance is N.P (where N is the order of the IFS). The MPA plots each pixel only once, consequently a pixel can only be in the queue once, thus the total number of transformations is just N.P. This shows that the MPA is optimal. The "cost" of the MPA is C(P) where C is the cost of a pixel calculation. For the RIA it can be shown that the "cost" for the lower bound is C(PlogP), for the same cost per pixel calculation.

Continuing the Sierpinski triangle example above the RIA achieves only 56% of the MPA performance after the same number of point plotting actions, 101258. The MPA needs 303774 transformations to reach the 101258 points. The approximate expression for the number of RIA iterations, (PlogP), suggests about one million iterations for the RIA to complete, actually about 94% of the points are reached in one million iterations.

The MPA can fail to construct the complete attractor in some extreme cases. Redefining the mapping from pixel to pixel can avoid the problem in some cases. A pixel may be regarded as a square set of points in the plane and all of these are transformed before pixelation. More calculations may be needed and the resulting attractor may not be well-defined. None the less the MPA is advantageous for general use.

A pixel in a fractal can have a property identified here as "density". Using the RIA, a histogram can be produced showing the frequency which a pixel is visited. The measure of the density can be used to represent, for example, a grey scale or color value assigned to the pixel. It is known to assign probabilities $p_k$ to the mappings $w_k$ of the IFS. This involves many more iterations during rendering than a simple, binary, image. The MPA only plots each pixel once so can not employ this technique.

The DIA can employ a form of this technique. The total value of the measure or "mass" for the image is known and the adapted DIA operates on an initially assumed distribution of the measure among the pixels. At each iteration the mass is redistributed among the pixels, weighted by the probability $p_k$. As long as the probabilities sum to 1.0 the total value of the measure (or "mass") is preserved while redistributed. This is the Constant Mass Algorithm (CMA). (See D. M. Monro, F. Dudbridge and A. Wilson, "Deterministic rendering of self affine fractals", IEE Colloquium on Fractal Techniques in Image Processing, 1990). Repeated visits to pixels in subsequent iterations can add color to the rendering. For example, consider a 256×256 array rendering a fractal maple leaf (a well-known test image widely used in the art) with a real number between 0 and 255 for each pixel for the color. For the "maple leaf" example after 15 iterations a total of 204401 measure redistributions have taken place and all 24330 pixels visited. At the 21st iteration, with a total of 350381 measure redistributions, fewer than 24 pixels change their value at the maximum, 8 bit, resolution. Thus the rendering is effectively finished. Even with the CMA the behaviour of the measures is unpredictable when there is a collage of overlapping parts. Accordingly while the CMA is generally better than the RIA more efficient methods are needed.

Fractal functions (f) provide a practical method for representing greyscale or color on attractors. Fractal functions can be visualized for tiling defined by IFS as adding an additional dimension to the tiling. For example the fractal function would be a surface lying over the tiling plane. As explained above, all the fractal coefficients need to be calculated and this has not been done hitherto or at best very approximately.

To render a fractal, including the fractal function defining the greyscale, the rendering algorithm chosen is applied in three dimensions. A simple approach is to assume that the tiling of an image is non-overlapping and that the fractal function is thus single valued. Accordingly a simple method is to assume that on hitting a pixel at a point (x, y) in it f(x, y) is the value of the pixel. This selected greyscale is only one of many that will occur within a pixel and might or might not be close to the average grey level within the pixel.

The MPA needs a slight modification. The fixed points of mappings $w_k$ are calculated giving the fixed points of $t_k$ and the values of f at these points, which values are assigned to the corresponding pixels. As the attractor of the domain part ($t_k$ or $T_k$ above) is next generated each pixel given by the function part ($V_k$ or $u_k$ above) is assigned a single probability value. Thus, the assigned grey scale value of a pixel is the value of the fractal function at some point within the pixel.

While generally effective, this last technique is not satisfactory in all cases, e.g. near high edge values in edge reconstruction or where tiles have high fractal index. This last technique, using arbitrary choice of grey scale, can give different results on rendering two image block differing only in their rotation or reflection. A technique enhancing the MPA while retaining efficiency is now described.

Consider rectangular blocks composed of four tiles meeting at a single point, somewhat as shown in FIG. 1, and centred on the origin. (The analysis will be readily extended by those skilled in the art to more general rectangles).

For each pixel with center (i,j) we define the greyscale p(i,j) to be the mean value of the fractal function over the pixel, that is:

$$p(i,j) = \int_{i-1/2}^{i+1/2} \int_{j-1/2}^{j+1/2} f(x, y) dx dy$$

Figure 16:
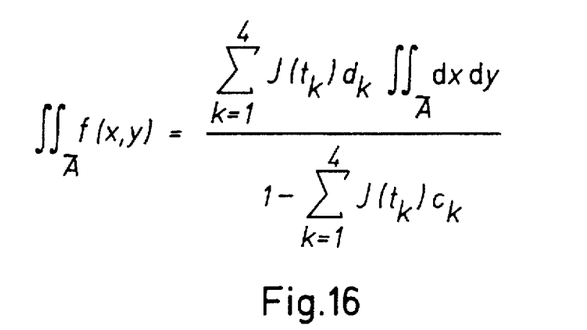

Summing over the four tiles which cover the parent block yields the equation in FIG. 16 which is exactly the integral of the fractal function over a parent block as:

$$\iint_A dx dy$$

is just the area of the block.

Figure 17:
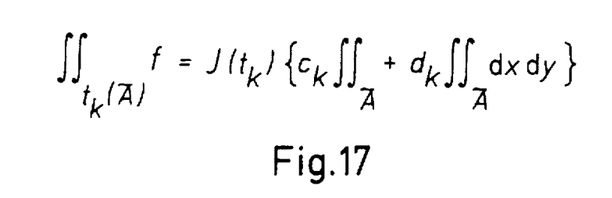

As the equation in FIG. 17 applies for each tile, $t_k(\tilde{A})$, f may be integrated over each of these tiles. Similarly f may be integrated over any composition of M transforms $t_{k1}(t_{k2}(\ldots (t_{k_M}(\tilde{A}))\ldots))$ in view of the implication of the invariance condition of $\tilde{A}$.

M is chosen so that the number of these tiles $t_k(\tilde{A})$ approximately matches the number of pixels. That is, M is the nearest integer to $\log_4 \iint_A dx dy$. The integrals of f are then evaluated for all the tiles $t_k(\tilde{A})$, the correct values of c and d to use are determined by computing the composite mappings. The greytone of a pixel is then a weighted sum of the integrals over the tiles it intersects, the weights being In proportion to the sizes of the intersections. When $\tilde{A}$ is a square whose side is a power of 2, each of the tiles exactly matches a pixel so the procedure is exact. In the case of a general rectangle exactness is not guaranteed since the pixels are square. Nonetheless the procedure remains very accurate.

Figure 18:
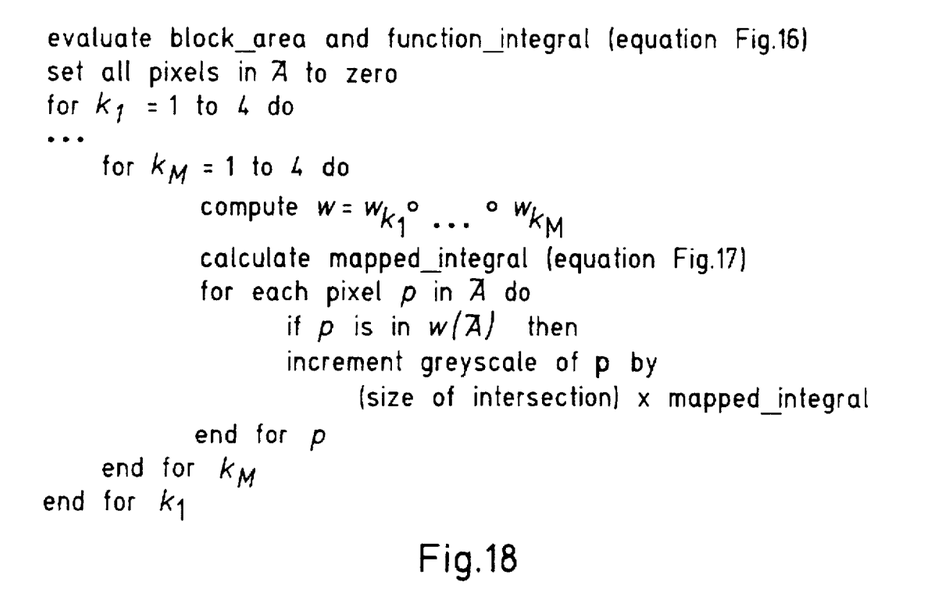

FIG. 18 summarizes the procedure in "pseudo code".

An example is an original of a 720×576 pixel standard image (Gold Hill) in YUV form, with 256 intensity levels. The color components (UV) are digitized to half the horizontal resolution of the intensity (Y). The Y image is approximated by the least squares technique (above) applied separately to the three components. The result is rendered by the MPA with the first described enhancement to improve tone rendering accuracy. The tiling scheme has a variable block size and the origin is not necesarily at the centre of the block. (This technique is described elsewhere in this specification.) The tiles thus also can vary in size. The number of blocks is 6480 for Y component and 3240 for each of U and V, the same totals as if uniform 8×8 pixel parent blocks are used. The resulting rendered fractal reconstruction of the image has the quality of the approximation improved by distributing the errors as evenly as possible over the picture.

Figure 19:
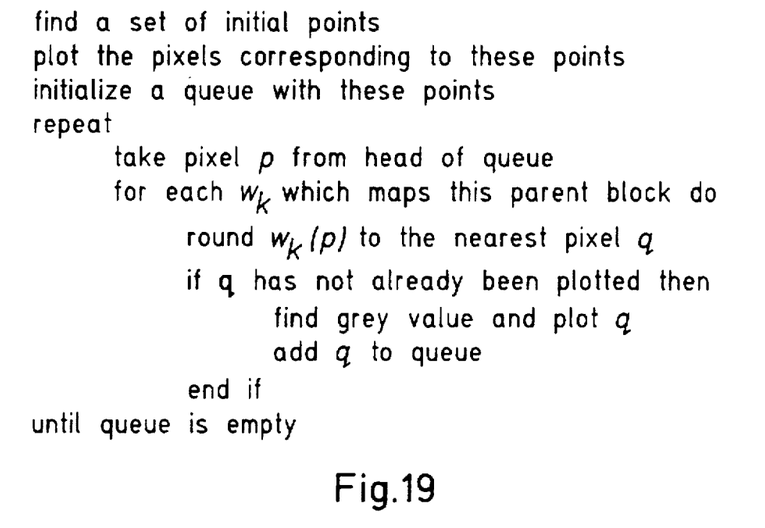

The simple form of MPA described above can be applied to a more general rectangular blocking scheme for images. If the domain part of a mapping describing a fractal function maps a parent block onto a tile which may not be within itself then, although the image will be completely tiled, the parent blocks can be anywhere. The fixed points can not then be easily defined since the invariant mappings will follow a complcated trajectory around the image. To render with the simple form of the MPA the algorithm shown in FIG. 19 is used. This ensures enough seed pixel values so that no region of the picture is missed.

Reference has been made above to the splitting or division of an image block into domains which are not equal in size and/or shape and optimisations which will accrue from such divisions.

The invention provides a technique for operating with variable block sizes and selecting a block size which takes into account local characteristics of an image. In particular, image processing techniques to predict in advance of coding errors arising locally in the coding process are provided. For example, in regions of the image where more or the largest errors could occur, smaller blocks will decrease such errors, while larger blocks are used for regions where fewer or lesser errors could occur. By using the same total number of blocks as in a uniform block size coding the errors are redistributed and fidelity improved with a little or no loss of compression. This permits larger compression ratios for the same fidelity. Also errors measured by metrics such as RMS errors or signal-to-error ratio can be reduced.

In this way, improvements in the fidelity of digitally compressed block coded images for digital television systems, information retrieval and other storage and transmission systems are achievable.

Figure 20:
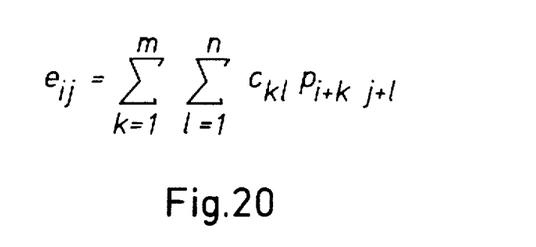

In general terms, the technique is operated by predicting error distribution or other quality distribution in coded images and using this prediction to determine partition. In one form the technique uses a digital filter such as a Finite Impulse Response (FIR) filter, implemented recursively, or as a moving average filter, or an Infinite Impulse Response (IIR) filter. A FIR based on array of coefficients is arranged so that a computer can predict an error, $e_{ij}$, in accordance with the equation in FIG. 20. Adjustments may be needed at the edges of the image. An alternative filter can be implemented in the domain of a transformation of all or part of the image. This may be a Fourier or Discrete Cosine or other digital transformation of the image. The filtered image is subjected to an inverse transform to produce the error or quality image measure. This measure is then used to control the first division or partition of the image to distribute the predicted error or other measure equally or in some other desirable way between the parts into which the image is to be divided. Each part is then further divided on the same basis and such division is continued for a required number of stages.

As an example of the application to the invention the standard test image "Gold Hill" was coded using fixed size, 8 by 8 pixel, blocks. The average of the RMS errors over all the blocks after reconstruction of the image was 7.43. When a Sobell edge operator was used as the moving average filter and was applied to the image to generate an edge image it was possible to produce a plot of the error in the 8 by 8 blocks. The error prediction was applied to partition the image into variable size blocks for coding to evenly distribute the predicted error into the partitioned parts. The resulting RMS error was at the reduced value of 5.75 and the picture quality was judged to have improved fidelity. The Sobell device is also applicable to the JPEG ADCT compression technique provided the requirement of fixed 8 by 8 pixels blocks is relaxed.

The techniques described above permit the improvement of the inverse and forward actions for image compression.

The deterministic graphical algorithm for constructing attractors can improve efficiency. Conservative upper bounds on accuracy can be established in terms of termination and optimality.

The rendering of greyscales on attractors is improved by the techniques by application of fractal functions. For an attractor which is a rectangle accurate assignment of pixel values in the reconstruction of fractally-encoded images is possible.

We claim:

1. A method of fractal coding of data relating to at least one of an image, speech, handwriting and information on various physical forms representing various phenomena, the method being performed using a processing apparatus, and the method comprising:

dividing the data into domains, applying analysis to the data for the domains to determine a set of transformations relating the domains to the data in such a manner so as to minimize error between the data and an approximation of the data, wherein the analysis step is accomplished by resolving the data for the domains into equations, and wherein determining the set of transformations so as to minimize the error involves solving the equations, and providing an expression including quantized fractal transformation coefficients characterizing the transformations.

2. A method according to claim 1 in which the data is information representative of a shape of an object.

3. A method according to claim 1 in which the transformations are characterized in that each includes at least two parts, at least one part indicating a domain and at least another functional part indicating a value for a measure associated with a specific domain or aspect thereof.

4. A method according to claim 1 in which the set of transformations corresponds to any solution of the equations which minimizes the error d (f,g) between one or more functions g and an approximation f to the function or functions expressed as an Iterated Function System, which is a standard representation for deterministic fractals.

5. A method according to claim 4 in which the Iterated Function System is divided into a domain part and one or more functional parts.

6. A method according to claim 1 in which the quantized fractal transformation coefficients are found from a set of linear equations.

7. A method according to claim 1, further comprising the step one of storing a series of the quantized fractal transformation coefficients and sending the series of quantized fractal transformation coefficients over a transmission path.

8. A method according to claim 7, further comprising the steps of retrieving or receiving the stored or transmitted coefficients, and reproducing a representation or a simulation of the data therefrom.

9. A method according to claim 1 in which the set of transformations is determined by a least squares approximation to the data.

10. A method according to claim 1, wherein the data pertains to an image, further comprising the step of dividing the data into image blocks, and dividing image block data representative of each image block into a plurality of domains which are related to the image block by a set of affine transformations.

11. A method according to claim 10 in which each image block is generally rectangular.

12. A method according to claim 11 in which the sizes and shapes of the domains are variable relative to one another.

13. A method according to claim 11 in which the domains are of different sizes.

14. A method according to claim 11, wherein the image block data includes grey-scale data as well as positional data and wherein the set of transformations is determined both on the basis of the positional data and on the basis of the grey-scale data.

15. A method according to claim 11, wherein the image block data includes colour data as well as positional data and wherein the set of transformations is determined both on the basis of positional data and on the basis of at least the colour data of colour images.

16. A method according to claim 10, further comprising the step of dividing each image block into a plurality of equal non-overlapping domains for the purpose of image encoding.

17. A method according to claim 1 in which said domains are not all of one size, the size being chosen in accordance with a measure value over the data to equalize the measure value among the domains.

18. A method according to claim 17 in which the measure value is a prediction of coding errors determined by passing the data through a filter to provide an error assessment output.

19. A method of fractal coding of data relating to at least one of an image, speech, handwriting and information on various physical forms representing various phenomena, the method being performed using a processing apparatus, and the method comprising:

dividing the data into domains, applying analysis to the data for the domains to determine a set of transformations relating the domains to the data in such a manner so as to minimize error between the data and an approximation of the data, wherein the analysis step includes resolving the data for the domains into equations to determine the set of transformations, and providing an expression including quantized fractal transformation coefficients characterizing the transformations, wherein the quantized fractal transformation coefficients are derived in linear time.

20. A method of fractal coding of data relating to an image, the method being performed using a processing apparatus, and the method comprising:

dividing the data into domains, applying analysis to the data for the domains to determine a set of transformations relating the domains to the data in such a manner as to minimize error between the data and an approximation of the data, wherein the analysis step is accomplished by resolving the data for the domains into equations, and wherein determining the set of transformations so as to minimize the error involves solving the equations, and providing an expression including quantized fractal transformation coefficients characterizing the transformations, the quantized fractal transformation coefficients being determined based on a linear relationship between coding complexity and image size.

21. A programmable apparatus for fractal coding of data relating to at least one of an image, speech, handwriting and information on various physical forms representing various phenomena, the apparatus comprising:

partitioning means for dividing the data into domains, analysis means and co-operative transformation means for determining a set of transformations relating the domains to the data in such a manner so as to minimize error between the data and an approximation to the data, wherein the analysis means resolves the data for the domains into equations, and wherein determining the set of transformations so as to minimize the error involves solving the equations, and quantization means for providing an expression including quantized fractal transformation coefficients characterizing the transformations.

22. A computer implemented system for coding images and to compress image data comprising:

partitioning means for dividing the image data into domains, analysis means and co-operative transformation means for determining a set of transformations relating the domains to the image data in such a manner so as to minimize error between the image data and an approximation to the image data, wherein the analysis means resolves the image data for the domains into equations, and wherein determining the set of transformations so as to minimize the error involves solving the equations, and quantization means for providing an expression including quantized fractal transformation coefficients characterizing the transformations so as to compress the image data to an order of 12:1.

23. A computer implemented system for coding image pixels comprising:

partitioning means for dividing image data into domains, analysis means and co-operative transformation means for determining a set of transformations relating the domains to the image data in such a manner so as to minimize error between the image data and an approximation to the image data, wherein the analysis means resolves the image data for the domains into equations to determine the set of transformations, and quantization means for providing an expression including quantized fractal transformation coefficients characterizing the set of transformations so that computational efficiency is linearly proportional to the number of image pixels.

24. A method of approximating information for storage or transmission in reduced form, the method being performed using a processing apparatus and including the steps of:

dividing the information into domains;

applying analysis to the information to determine a set of transformations relating the domains to the information in such a manner so as to minimize error occurring between the information and an approximation of the information, wherein the analysis step further includes resolving the information for the domains into equations, and wherein determining the set of transformations so as to minimize the error involves solving the equations, providing a function expressing the information, and deriving from the set of transformations an iterated function system having a domain part and a functional part, and characterizing the reduced form of the information by the iterated function system.

25. A storage medium recorded with a fractal coding of data obtained by a method wherein data relating to at least one of an image, speech, handwriting and information on various physical forms representing various phenomena is fractal coded, and the method comprising:

dividing the data into domains, applying analysis to the data for the domains to determine a set of transformations relating the domains to the data in such a manner so as to minimize error between the data and an approximation of the data, wherein the analysis step includes resolving the data for the domains into equations, and wherein determining the set of transformations so as to minimize the error involves solving the equations, and providing an expression including quantized fractal transformation coefficients characterizing the transformations.

26. A computer implemented system for fractal coding of data, storing and/or transmitting the fractal coded data and decoding the fractal coded data after the storing and/or transmission operation to reconstitute the data, comprising the steps of:

coding the data in accordance with a method comprising:

dividing the data into domains, applying analysis to the data for the domains to determine a set of transformations relating the domains to the data in such a manner so as to minimize error between the data and an approximation of the data, wherein the analysis step includes resolving the data for the domains into equations, and wherein determining the set of transformations so as to minimize the error involves solving the equations, and providing an expression including quantized fractal transformation coefficients characterizing the transformations.

27. A computer implemented system for fractal coding of data representative of a physical phenomena, storing and/or transmission of fractal coded data and decoding of the fractal coding after the storing and/or transmission to reconstitute such data in accordance with a method of processing of a fractal from its previously determined code carried out by the computer and including the steps of:

a) fractal coding the data by performing the steps of:
dividing the data into domains,
applying analysis to the data for the domains to determine a set of transformations relating the domains to the data in such a manner so as to minimize error between the data and an approximation of the data, wherein the analysis step includes resolving the data for the domains into equations, and wherein determining the set of transformations so as to minimize the error involves solving the equations,
providing an expression including quantized fractal transformation coefficients characterizing the transformations, b) performing one of storing and transmitting the expression as the fractal coded data, and c) decoding the fractal coded data by performing the steps of:
deriving fixed points of all the transformations needed for the fractal,
forming a rounded approximation pixel for each point, and
providing an output of said pixels as a finite approximation to an attractor of the fractal.

* * * * *